Oct. 25, 1932.  G. H. S. McNAIR  1,884,061
PERCOLATOR
Filed Nov. 8, 1930  2 Sheets-Sheet 1
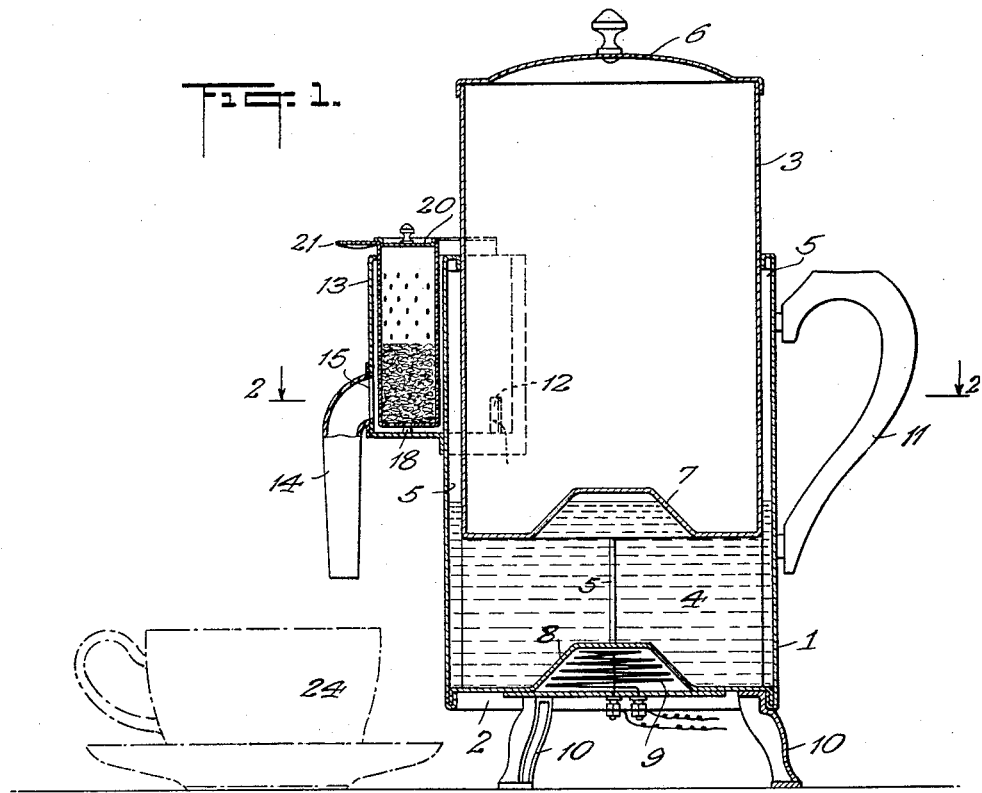
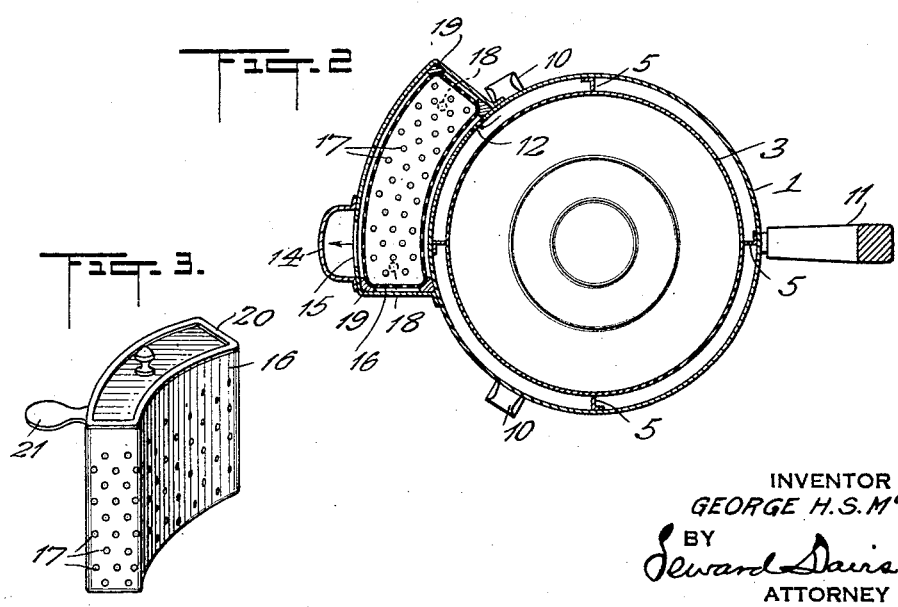
INVENTOR
GEORGE H. S. McNAIR
BY
Seward Davis
ATTORNEY Oct. 25, 1932.  G. H. S. McNAIR  1,884,061
PERCOLATOR
Filed Nov. 8, 1930  2 Sheets-Sheet 2
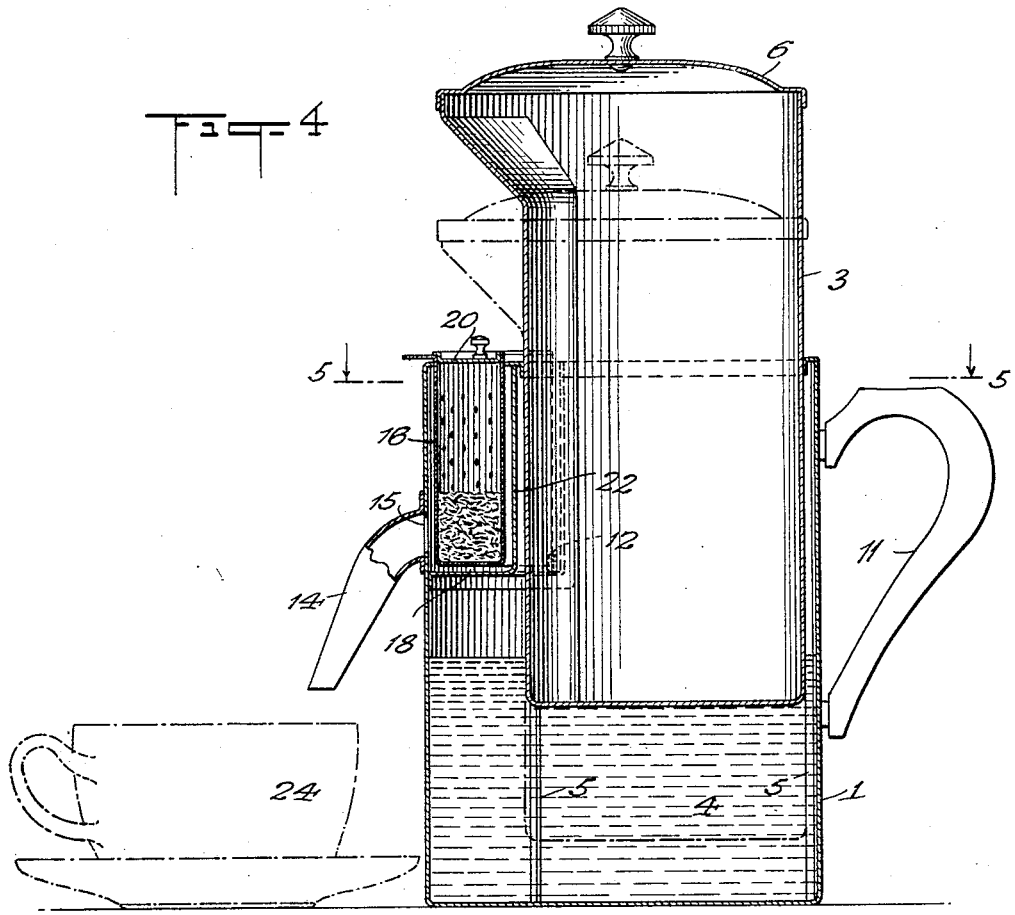
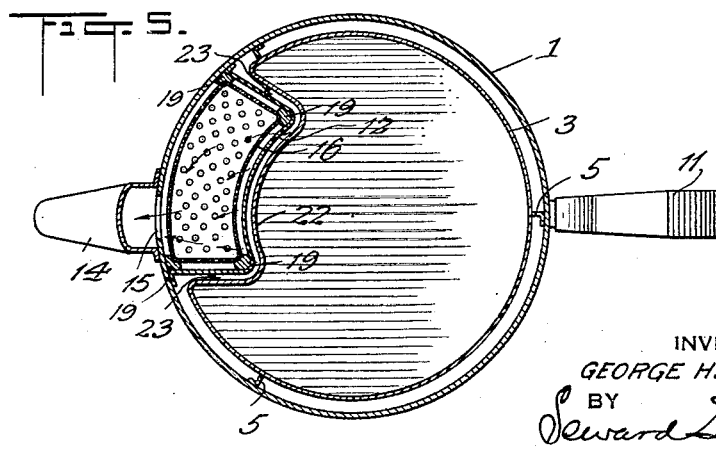
INVENTOR
GEORGE H. S. McNAIR.
BY
Seward Davis
ATTORNEY Patented Oct. 25, 1932

1,884,061

UNITED STATES PATENT OFFICE

GEORGE H. S. McNAIR, OF HASTINGS-ON-HUDSON, NEW YORK

PERCOLATOR

Application filed November 8, 1930. Serial No. 494,217.

This invention relates to percolators for making infusions of tea and coffee, and more particularly to a percolator for the infusion of tea. It has for its objects the provision of a means whereby tea leaves or ground coffee beans may be freshly infused with water for each cupful to be drawn or poured from the percolator, and which infusions may be regulated according to the temperature desired.

With these objects in view and further objects as hereinafter pointed out, my invention consists in a device of the character recited, constructed as next set forth and as illustrated in the drawings, and as particularly pointed out in the appended claims.

In the accompanying drawings, Figure 1 is a view in vertical section of a percolator embodying my invention. Figure 2 is a view in horizontal section on the line 2—2 of Figure 1, in the direction indicated by the arrows. Figure 3 is a view in perspective of a receptacle for holding the substance to be infused. Figure 4 is a view, similar to Figure 1, of a modified form of percolator; and Figure 5 is a view in horizontal section on the line 5—5 of Figure 4.

Like reference characters indicate like parts in the several figures. The percolator comprises a vessel 1, open at the top and having the bottom 2; a closed chamber 3 adapted to float upon the water 4 in said vessel, and to be centered therein by the vertical guides 5. This chamber may be provided with a lid 6 and its bottom may be provided with a centrally recessed portion 7 to accommodate a like portion 8 of the bottom 2 of the vessel 1 adapted to house a heating coil 9 and to afford an enlarged heating surface in contact with the water. The vessel 1 may also be provided with feet 10 and a handle 11. An orifice 12 in the vessel 1 communicates with a chamber 13 having the spout 14. This spout's opening 15 into the chamber 13 is at a level above that of the orifice 12, for the reason hereinafter explained. The chamber 13 accommodates a perforated receptacle 16 adapted to receive the tea leaves or other material to be infused. This receptacle 16 has the perforations 17 in its sides and bottom. It is raised above the bottom of the chamber 13 by the spacers 18 and centered by the vertical guides 19. It is preferably provided with a lid 20 and a handle 21.

In the modified form shown in Figures 4 and 5, the receptacle 16 is housed within the vessel 1 and presents a more compact form, in which the chamber 3 is correspondingly recessed vertically to permit relative movement of said chamber within the vessel, such vertical recess having the inturned wall portion 22 whose configuration conforms generally to that of the chamber 13 and its contained receptacle 16, additional vertical guides 23 in this case being provided. This modified form is adapted for use upon a stove, hence the bottom 24 is made flat and the closed chamber has a like bottom.

The operation of my percolator is as follows: The receptacle 16 is filled with material to be infused. The vessel 1 is filled to a level below the orifice 12 with water and heat is applied to the bottom of the vessel. When the water is hot and infusion is desired, the chamber 3 is manually depressed, as indicated at Fig. 4 in broken lines, whereby the water is displaced. When the water thus forced upward about the chamber reaches the level of the orifice 12, it seeks outlet therethrough and flows into the chamber 13 and through the perforations 17 into the receptacle 16, where it contacts with the material to be infused. As the inlet orifice 12 is at one end of the chamber 13, and the outlet orifice 15 is at the opposite end of the chamber, the water flows the length thereof and discharges through the spout into the cup 24, which is indicated by broken lines. When pressure is released, the chamber 3 rises, and the water level falls. The drainage from the infused material returns to the vessel 1 through orifice 12 because it is below the level of the orifice 15, whereby dripping from the spout is avoided. Thus a fresh infusion of tea or the like is made with hot water each time a cup is poured, and the tea leaves may be reused until their strength is gone, thereby avoiding such waste of tea as inheres in the use of fresh leaves for each cup. The percolator is not only efficient and economical, but is also sanitary and cleanly in use.

Obviously the handle permits pouring from the percolator if desired, for which use it is adapted either with or without the float chamber.

Having thus described the preferred form of my invention whereby its recited objects are attained, I claim:

1. In a percolator, the combination of a container adapted to hold a liquid, a float chamber within said container and substantially equal thereto in capacity, adapted to displace said liquid when depressed and to force it from the container, a housing upon a wall of said container adapted to contain material to be infused, an inlet in a wall of said housing near the bottom thereof and in communication with said container, and an outlet in another wall of said housing at a higher level than the inlet and remote therefrom.

2. In a percolator, the combination of a container adapted to hold a liquid, a float chamber within said container and adapted to displace substantially all said liquid when depressed, guides vertically disposed between said container and said float chamber, a housing upon a wall of said container, a receptacle within said housing for the material to be infused, an inlet in a wall of said housing near the bottom thereof and in communication with said container, and an outlet in another wall of said housing at a higher level than the inlet and remote therefrom, whereby depression of said float chamber forces the liquid from the container and through said receptacle and from said outlet.

3. In a percolator, the combination of an outer vessel adapted to contain liquid, an inner chamber adapted to float on liquid in said outer vessel and to displace said liquid when depressed, a housing in communication with said outer vessel, a receptacle having perforated walls, said receptacle being adapted to seat in said housing and contain a material to be infused by the passage of liquid therethrough when said float chamber is depressed, and an outlet from said housing.

4. In a percolator, the combination of an outer vessel adapted to contain liquid, an inner chamber adapted to float on liquid in said outer vessel, a housing having an inlet communicating with said outer vessel, a receptacle having perforated walls, said receptacle being seated in said housing and adapted to contain a material to be infused by the passage of liquid therethrough, and an outlet from said housing, said outlet being located above the level of the said inlet and at a point in said housing remote from said inlet.

5. In a percolator, the combination of a water container, a float chamber free to move vertically in said container, and adapted when depressed to permit the water displaced thereby to rise in said container around said chamber, an opening in the wall of said container, a foraminated receptacle adapted to contain material to be readily infused by the passage of hot water therethrough; a housing for said receptacle; a pair of openings in the walls of said housing at opposite ends thereof, one opening being in communication with the interior of the container, and the other with a spout, and means for heating the water in said container.

6. In a percolator, the combination of a container adapted to hold water, a housing upon a side of said container, a receptacle adapted to seat in said housing, said receptacle having a bottom and side walls permitting circulation of water therethrough, an inlet to said housing opening into said container, an outlet from said housing, and a spout in communication with said outlet, the inlet opening and the outlet opening, respectively, being adjacent opposite sides of said receptacle.

7. In a percolator, the combination of a container adapted to hold water, a housing upon a side of said container, a receptacle adapted to seat in said housing, said receptacle having a bottom and side walls permitting circulation of water therethrough, an inlet to said housing opening into said container, an outlet from said housing, and a spout in communication with said outlet, the inlet opening and the outlet opening, respectively, being adjacent opposite sides of said receptacle, the said outlet being above the level of the said inlet.

GEORGE H. S. McNAIR.